US009617101B2

(12) United States Patent
Hosokawa

(10) Patent No.: US 9,617,101 B2
(45) Date of Patent: Apr. 11, 2017

(54) TAPE PRINTING DEVICE, TAPE LENGTH CALCULATION METHOD, AND COMPUTER-READABLE RECORDING MEDIUM

(71) Applicant: Seiko Epson Corporation, Tokyo (JP)

(72) Inventor: Takeshi Hosokawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 428 days.

(21) Appl. No.: 14/215,139

(22) Filed: Mar. 17, 2014

(65) Prior Publication Data

US 2014/0289292 A1 Sep. 25, 2014

(30) Foreign Application Priority Data

Mar. 21, 2013 (JP) ................................ 2013-057773

(51) Int. Cl.

*G06F 1/16* (2006.01)
*B65H 19/12* (2006.01)
*B65B 59/00* (2006.01)
*D04D 7/10* (2006.01)
*B41J 3/407* (2006.01)
*B65B 67/00* (2006.01)

(52) U.S. Cl.

CPC ............ *B65H 19/12* (2013.01); *B41J 3/4075* (2013.01); *B65B 59/00* (2013.01); *D04D 7/10* (2013.01); *B65B 67/00* (2013.01)

(58) Field of Classification Search

CPC ........... B41J 3/4075; B65B 59/00; D04D 7/10
USPC ........................................................ 708/105
See application file for complete search history.

(56) References Cited

U.S. PATENT DOCUMENTS

2004/0033099 A1* 2/2004 Van Bever ............. B41J 3/4075 400/615.2
2016/0189013 A1* 6/2016 Sano .................... G06K 15/022 358/1.5

FOREIGN PATENT DOCUMENTS

JP 61-060427 A 3/1986
JP 2009-101527 A 5/2009
JP 2011-46042 A 3/2011

* cited by examiner

*Primary Examiner* — Tan V. Mai
(74) *Attorney, Agent, or Firm* — ALG Intellectual Property, LLC

(57) ABSTRACT

A tape printing device for printing on a ribbon tape includes: a wrapping length acquisition unit which acquires a ribbon wrapping length that is a necessary length of a ribbon tape for ribbon wrapping, of a necessary tape length that is a necessary length of the ribbon tape for ribbon wrapping and ribbon tying on an object to be wrapped; a tying length storage unit in which a ribbon tying length that is a necessary length of the ribbon tape for ribbon tying, of the necessary tape length, is stored; and a necessary tape length calculation unit which calculates the necessary tape length, based on the ribbon wrapping length that is acquired and the ribbon tying length that is stored.

7 Claims, 11 Drawing Sheets

< TYING LENGTH DATA >

| TYING METHOD INFORMATION | RIBBON TYING LENGTH [cm] |
|---|---|
| NONE | 1 |
| SINGLE BOW | 41 |
| DOUBLE BOW | 81 |
| ⋮ | ⋮ |

FIG. 4

< NECESSARY SIDE DATA >

| WRAPPING METHOD INFORMATION | NECESSARY SIDE |
|---|---|
| HORIZONTAL STRAIGHT LINE WRAPPING | WIDTH × HEIGHT |
| VERTICAL STRAIGHT LINE WRAPPING | DEPTH × HEIGHT |
| CROSS WRAPPING | WIDTH × DEPTH × HEIGHT |
| HORIZONTAL TRIANGLE WRAPPING | WIDTH × HEIGHT |
| ⋮ | ⋮ |

FIG. 5

< COEFFICIENT DATA >

| WRAPPING METHOD INFORMATION | COEFFICIENT | | |
|---|---|---|---|
| | WIDTH | DEPTH | HEIGHT |
| HORIZONTAL STRAIGHT LINE WRAPPING | 2 | N/A | 2 |
| VERTICAL STRAIGHT LINE WRAPPING | N/A | 2 | 2 |
| CROSS WRAPPING | 2 | 2 | 4 |
| HORIZONTAL TRIANGLE WRAPPING | 5 | N/A | 4 |
| ⋮ | ⋮ | ⋮ | ⋮ |

FIG. 6

51
①Happy Birthday
②Hana
" FIXED LENGTH "

FIXED LENGTH
52
DESIGNATE PERIMETER
DESIGNATE BOX SIZE
20cm
"1"

FIXED LENGTH
52
DESIGNATE PERIMETER
DESIGNATE BOX SIZE
" SELECT "

PERIMETER
56
20
cm
CHANGE LENGTH
WITH UP/DOWN CURSOR

TAPE PRINTING DEVICE, TAPE LENGTH CALCULATION METHOD, AND COMPUTER-READABLE RECORDING MEDIUM

CROSS-REFERENCE TO RELATED APPLICATION

The entire disclosure of Japanese Patent Application No. 2013-057773, filed Mar. 21, 2013 is expressly incorporated by reference herein.

BACKGROUND

1. Technical Field

The present invention relates to a tape printing device, a tape length calculation method and a computer-readable recording medium for calculating a necessary length of a ribbon tape for ribbon wrapping and ribbon tying on an object to be wrapped.

2. Related Art

According to the related art, a tape printing device capable of printing a message or the like on a ribbon tape used for ribbon wrapping and ribbon tying on an object to be wrapped is known (see JP-A-2011-46042). Also, a tape printing device including a function to print on a tape having a length inputted by the user (fixed-length printing function) is known (See JA-A-2009-101527).

In the tape printing devices according to the related art, when the user wants to obtain a ribbon tape having a necessary length for ribbon wrapping and ribbon tying, an estimated value of the necessary length of the ribbon tape for ribbon wrapping and ribbon tying is inputted by the user and the fixed-length printing function performs printing on the ribbon tape having the inputted length. A necessary length of a ribbon tape for ribbon wrapping can be estimated by the user measuring the dimension of an object to be wrapped, in some cases of simple ribbon wrapping. However, a necessary length of a ribbon tape for ribbon tying is difficult to estimate particularly for a user who is unfamiliar with wrapping. While a tape measure to confirm a necessary length of a ribbon tape for ribbon wrapping and ribbon tying is prepared, the user needs to use the tape measure to actually carryout ribbon wrapping and ribbon tying. Therefore, easier methods are demanded.

SUMMARY

An advantage of some aspects of the invention is that a tape length calculation device capable of easily finding a necessary length of a ribbon tape, a tape printing device having the tape length calculating device, a tape length calculation method and a computer-readable recording medium are provided.

An aspect of the invention is directed to a tape printing device including: a wrapping length acquisition unit which acquires a ribbon wrapping length that is a necessary length of a ribbon tape for ribbon wrapping, of a necessary tape length that is a necessary length of the ribbon tape for ribbon wrapping and ribbon tying on an object to be wrapped; a tying length storage unit in which a ribbon tying length that is a necessary length of the ribbon tape for ribbon tying, of the necessary tape length, is stored; and a necessary tape length calculation unit which calculates the necessary tape length, based on the ribbon wrapping length that is acquired and the ribbon tying length that is stored.

According to this configuration, the necessary tape length calculation unit calculates the necessary tape length, based on the ribbon wrapping length acquired by the wrapping length acquisition unit and the ribbon tying length stored in the storage unit. Therefore, even when it is difficult for the user to estimate the ribbon tying length, the necessary tape length can be easily found by having the ribbon wrapping length acquired by the wrapping length acquisition unit.

In this case, it is preferable that the device further includes a dimension acquisition unit which acquires dimensions of at least two sides corresponding to sites where the ribbon tape is laid for ribbon wrapping, of three sides of width, depth and height of the object to be wrapped that is in the shape of a rectangular, and that the wrapping length acquisition unit calculates the ribbon wrapping length based on the dimensions that are acquired.

According to this configuration, the wrapping length acquisition unit calculates the ribbon wrapping length, based on the dimensions of the object to be wrapped acquired by the dimension acquisition unit. Therefore, even when it is difficult for the user to estimate the ribbon wrapping length, the ribbon wrapping length can be easily found by having the dimensions of the object to be wrapped acquired by the dimension acquisition unit.

In this case, it is preferable that the device further includes a wrapping method information acquisition unit which acquires wrapping method information about a type of ribbon wrapping on the object to be wrapped, and a coefficient storage unit in which coefficient data associating the wrapping method information with a coefficient of the ribbon wrapping length corresponding to the dimensions is stored, and that the wrapping length acquisition unit calculates the ribbon wrapping length, based on the coefficient of the ribbon wrapping length associated with the wrapping method information that is acquired and the dimensions that are acquired.

If the type of ribbon wrapping on the object to be wrapped differs, the ribbon wrapping length differs even if the dimensions of the object to be wrapped are the same.

In this respect, according to this configuration, the wrapping length acquisition unit calculates the ribbon wrapping length, based on the coefficient of the ribbon wrapping length associated with the wrapping method information and the dimensions of the object to be wrapped. Therefore, by having the wrapping method information and the dimensions of the object to be wrapped acquired, the ribbon wrapping length corresponding to the wrapping method information (the type of ribbon wrapping) can be easily found. Thus, when the user carries out plural types of ribbon wrapping, an appropriate necessary tape length for each type can be found and convenience is enhanced.

In this case, it is preferable that the device further includes a necessary side storage unit in which necessary side data associating the wrapping method information with a necessary side to calculate the ribbon wrapping length, of the three sides of width, depth and height of the object to be wrapped, is stored, and that the dimension acquisition unit has a display unit for displaying a dimension input window to cause the user to input the dimensions, and causes the display unit to display the dimension input window where the side inputted by the user is changed, based on the necessary side associated with the wrapping method information that is acquired.

For example, if the type of ribbon wrapping is cross wrapping, the dimensions of the three sides of width, depth and height of the object to be wrapped are necessary in order to calculate the ribbon wrapping length. Meanwhile, if the type of ribbon wrapping is horizontal straight line wrapping, the dimensions of the two sides of width and height of the object to be wrapped are enough in order to calculate the ribbon wrapping length. Therefore, in the case of horizontal straight line wrapping, if the user is made to input the dimensions of all the three sides, the input of the dimension of depth is useless.

In this respect, according to this configuration, the dimension acquisition unit causes the display unit to display the dimension input window so as to cause the user to input only the necessary side to calculate ribbon wrapping length, according to the type of ribbon wrapping. Therefore, of the dimensions of the three sides of width, depth and height of the object to be wrapped, the user can be made to simply input the dimension of the necessary side to calculate the ribbon wrapping length, and the user's time and effort for input can be saved.

In this case, it is preferable that the device further includes a tying method information acquisition unit which acquires tying method information about a type of ribbon tying on the object to be wrapped, that the tying length storage unit stores tying length data associating the ribbon tying length with the tying method information, and that the necessary tape length calculation unit calculates the necessary tape length, based on the ribbon tying length associated with the tying method information that is acquired.

If the type of ribbon tying on the object to be wrapped differs, the ribbon tying length differs.

In this respect, according to this configuration, the necessary tape length calculation unit calculates the necessary tape length, based on the ribbon tying length associated with the tying method information. Therefore, by having tying method information acquired by the tying method information acquisition unit, the necessary tape length corresponding to the tying method information (the type of ribbon tying) can be easily found. Thus, when the user carries out plural types of ribbon tying, an appropriate necessary tape length for each type can be found and convenience is enhanced.

Another aspect of the invention is directed to a tape printing device including: a tape feeding unit which reels off and feeds a ribbon tape that is set in such a way that the ribbon tape can be reeled off; a control unit which controls the tape feeding unit so as to feed the ribbon tape with a calculated necessary tape length; and a printing unit which prints on the ribbon tape that is fed.

According to this configuration, a ribbon tape with a print thereon having an appropriate length for ribbon wrapping and ribbon tying can be obtained easily.

Still another aspect of the invention is directed to a tape length calculation method including: acquiring a ribbon wrapping length that is a necessary length of a ribbon tape for ribbon wrapping, of a necessary tape length that is a necessary length of the ribbon tape for ribbon wrapping and ribbon tying on an object to be wrapped; reading out a ribbon tying length that is a necessary length of the ribbon tape for ribbon tying, from a storage unit in which the ribbon tying length is stored; and calculating the necessary tape length, based on the ribbon wrapping length that is acquired and the ribbon tying length that is read out.

Yet another aspect of the invention is directed to a computer-readable recording medium including a program recorded therein for causing a computer to execute the above tape length calculation method.

According to this configuration, the necessary tape length is calculated, based on the ribbon wrapping length that is acquired and the ribbon tying length read out from the storage unit. Therefore, even when it is difficult for the user to estimate the ribbon tying length, the necessary tape length can be easily found by having the ribbon wrapping length acquired.

BRIEF DESCRIPTION OF THE DRAWINGS

The invention will be described with reference to the accompanying drawings, wherein like numbers reference like elements.

FIG. 4 shows an example of tying length data.

FIG. 5 shows an example of necessary side data.

FIG. 6 shows an example of coefficient data.

DESCRIPTION OF EXEMPLARY EMBODIMENTS

Hereinafter, a tape printing device according to an embodiment of the invention will be described with reference to the accompanying drawings. The tape printing device of this embodiment is configured to print a message such as "Happy Birthday" on a ribbon tape used for ribbon wrapping and ribbon tying on an object to be wrapped.

Figure 1A:
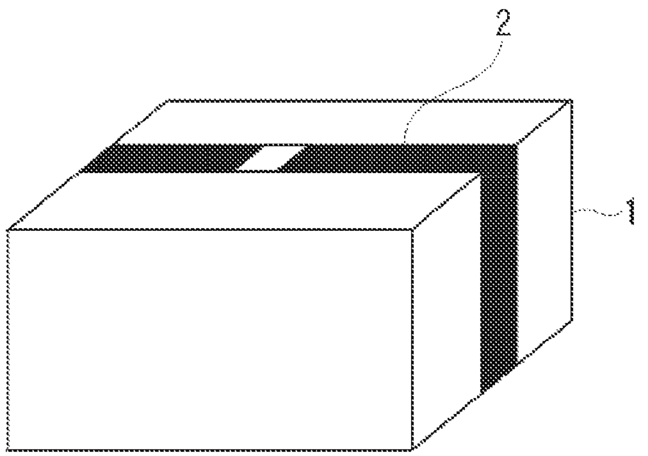
FIGS. 1A to 1C show specific examples of ribbon wrapping and ribbon tying on a rectangular object to be wrapped.
Figure 1B:
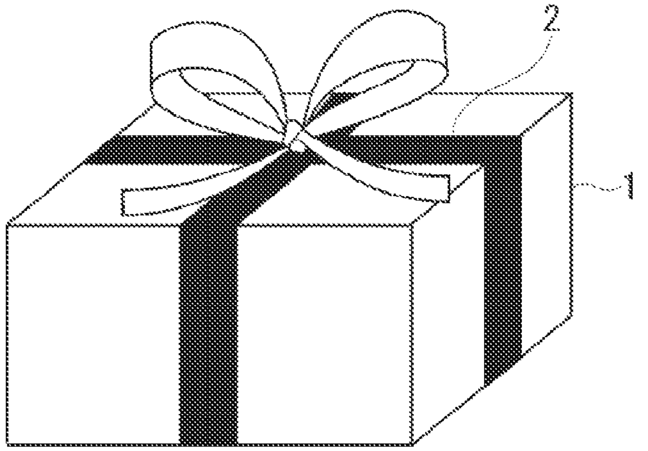
Figure 1C:
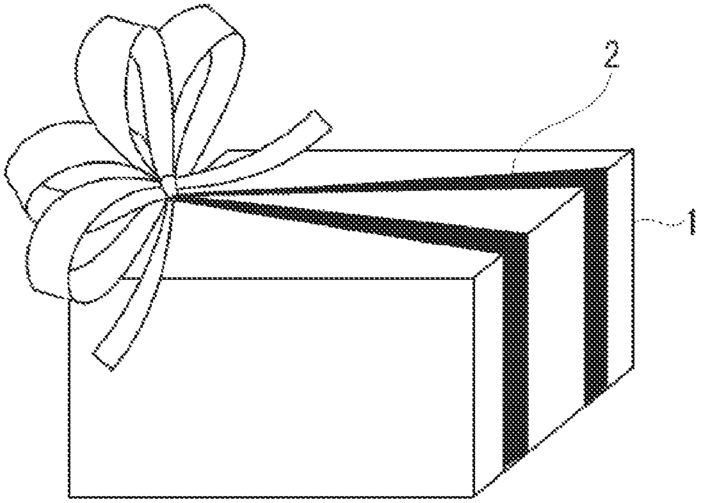

First, referring to FIGS. 1A to 1C, specific examples of ribbon wrapping and ribbon tying on an object to be wrapped 1 in the shape of a rectangular (parallelepiped box) are described. Here, "ribbon wrapping" refers to laying a ribbon tape 2 along surfaces of the object to be wrapped 1. In FIGS. 1A to 1C, ribbon wrapping parts of the ribbon tape 2 are shown in solid black. Meanwhile, "ribbon tying" refers to creating a tied part of the ribbon tape 2 after ribbon wrapping. In FIGS. 1A to 1C, tied ribbon parts of the ribbon tape 2 are shown in solid white. In FIGS. 1A to 1C, messages or the like printed on the ribbon tape 2 are omitted.

FIG. 1A shows a case where the type of ribbon wrapping is "horizontal straight line wrapping" and the type of ribbon tying is "none". In the case of the type of ribbon tying "none", there is no knot and both ends of the ribbon tape 2 are bonded together instead via an adhesive tape or the like. That is, this bonded part serves as a knot. The type of ribbon tying "none" is used in cases where a separately prepared ribbon bow is attached, or the like.

FIG. 1B shows a case where the type of ribbon wrapping is "cross wrapping" and the type of ribbon tying is "single bow". "Single bow" means a knot having one loop each on both left and right hand sides.

FIG. 1C shows a case where the type of ribbon wrapping is "horizontal triangle wrapping" (V wrapping) and the type of ribbon tying is "double bow". "Double bow" means a knot having two loops each on both left and right hand sides.

Figure 2:
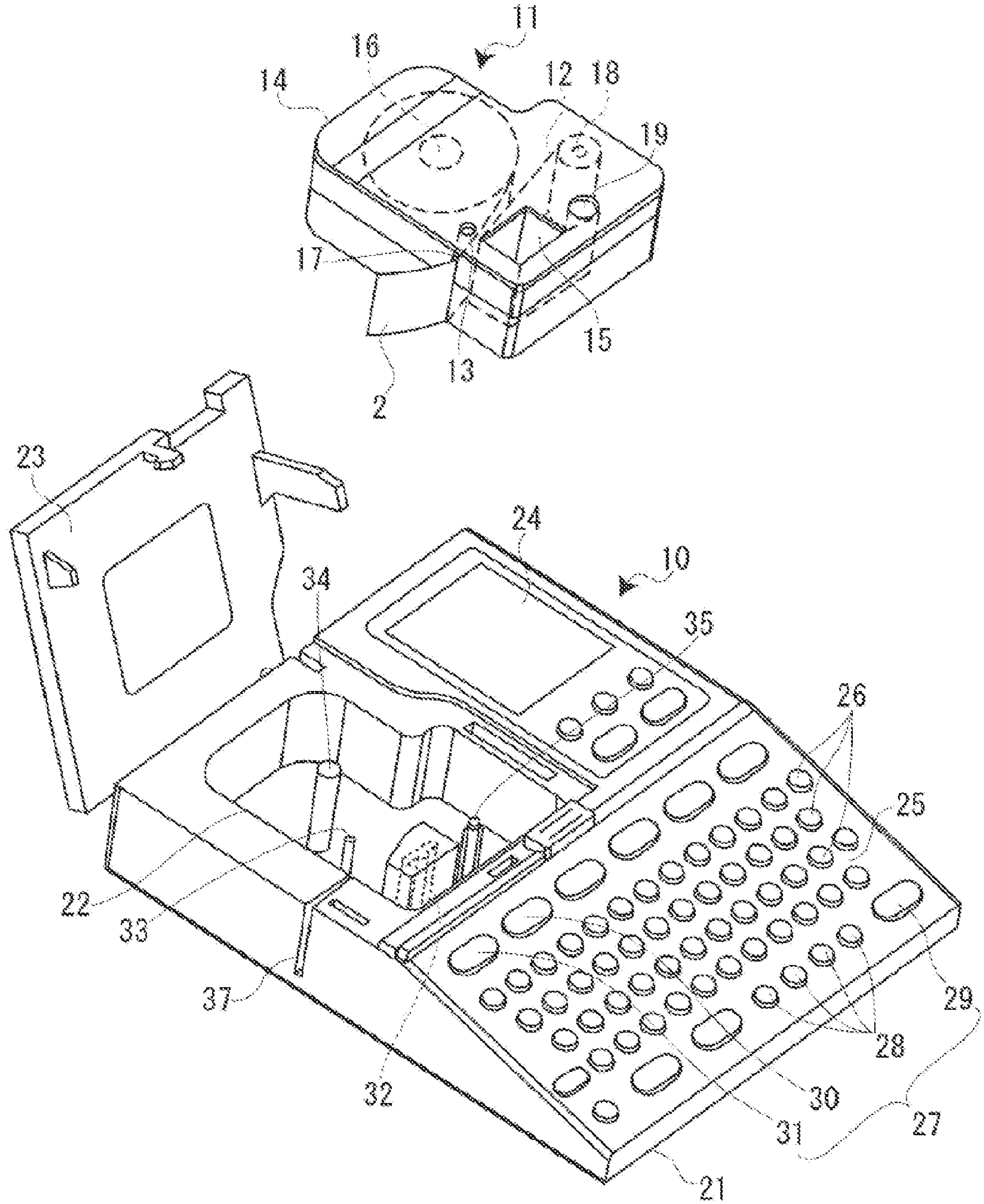
FIG. 2 is a perspective view of a tape printing device and a tape cartridge.

As shown in FIG. 2, in a tape printing device 10, a tape cartridge 11 in which the ribbon tape 2 is housed in such away that the ribbon tape 2 can be reeled off is installed, and a print is made on the ribbon tape 2 while the ribbon tape 2 is reeled off from the tape cartridge 11, thus creating a ribbon tape 2 with a print thereon.

The tape cartridge 11 installed in the tape printing device 10 has the ribbon tape 2, an ink ribbon 12, a platen roller 13, and a cartridge case 14 housing these components. In the cartridge case 14, a head opening 15 in which a print head 32, later described, is inserted is formed, vertically penetrating the case cartridge 14.

The ribbon tape 2 is made of a cloth used for wrapping and is wound on a tape core 16 in such a way that the ribbon tape 2 can be reeled off. The ribbon tape 2 that is reeled off is sent outside the cartridge case 14 through a tape send-out port 17 formed in a left sidewall of the cartridge case 14.

The ink ribbon 12 is wound on a ribbon reel-off reel 18 in such a way that the ink ribbon 12 can be reeled off. The ink ribbon 12 that is reeled off is taken up by a ribbon take-up reel 19. The platen roller 13 is provided to face the print head 32 inserted in the head opening 15.

The platen roller 13 is rotationally driven by the tape printing device 10 and rotationally feed the ribbon tape 2 and the ink ribbon 12 sandwiched between the print head 32 and the platen roller 13.

An outer shell of the tape printing device 10 is formed by a device case 21, and a keyboard 25 is arranged in a broad area on an upper surface of a front half part of the device case 21. On an upper surface of a rear half part of the device case 21, a cartridge installation section 22 in which the tape cartridge 11 is removably installed is provided as a recess. In the cartridge installation section 22, an open-close cover 23 to open and close the cartridge installation section 22 is provided. Also, a display unit 24 is provided to the right of the cartridge installation section 22.

The keyboard 25 is provided with character keys 26 to input and edit characters, symbols and the like, and function keys 27 to carry out various selections and finalization processing or the like. The function keys 27 include cursor keys 28 to move a cursor or selection candidate displayed on the display unit 24 in up, down, left and right directions, a select key 29 to finalize an option at the time of selecting functions or input and conversion of characters, a fixed-length key 30 to carry out fixed-length print, later described, and a print key 31 to designate execution of print, or the like.

The display unit 24 includes, for example, a liquid crystal display and is used by the user when inputting characters, symbols or the like via the keyboard 25 or when selecting various options.

In the cartridge installation section 22, a thermal-type print head 32, a platen drive shaft 33 engaged with the platen roller 13 in the tape cartridge 11 so as to rotate the platen roller 13, a guide protrusion 34 to guide installation of the tape cartridge 11, and a ribbon take-up drive shaft 35 engaged with the ribbon take-up reel 19 so as to rotate the ribbon take-up reel 19 are provided respectively in a protruding manner.

On the back side of the cartridge installation section 22, a feed motor 36 (see FIG. 3) to rotate the platen drive shaft 33 and the ribbon take-up drive shaft 35 is arranged inside. Also, a circuit board forming a control unit 40 (see FIG. 3), later described, or the like is installed inside the device case 21.

In a left part of the device case 21, a vertically extending slit-like tape discharge port 37 is formed. The tape discharge port 37 continues to the cartridge installation section 22. The ribbon tape 2 reeled off from the tape cartridge 11 installed in the cartridge installation section 22 is discharged outside the device through the tape discharge port 37.

Here, a series of print processing in the tape printing device 10 will be briefly described. First, the user installs the tape cartridge 11 in the cartridge installation section 22. Also, the user edits a desired text via the keyboard 25 while confirming a result of input on the display unit 24. The tape printing device 10 crates print data based on the content of the input. As the user operates the print key 31, the tape printing device 10 rotationally drives the platen roller 13 to reel off the ribbon tape 2 from the tape cartridge 11, and heats and drives the print head 32 on the basis of the print data, thus printing on the ribbon tape 2 that is fed (the print includes blank prints). Thus, the ribbon tape 2 with a desired print thereon is discharged outside the device through the tape discharge port 37. The user may cut out the discharged part with scissors or the like, thus obtaining the ribbon tape 2 used for wrapping.

Figure 3:
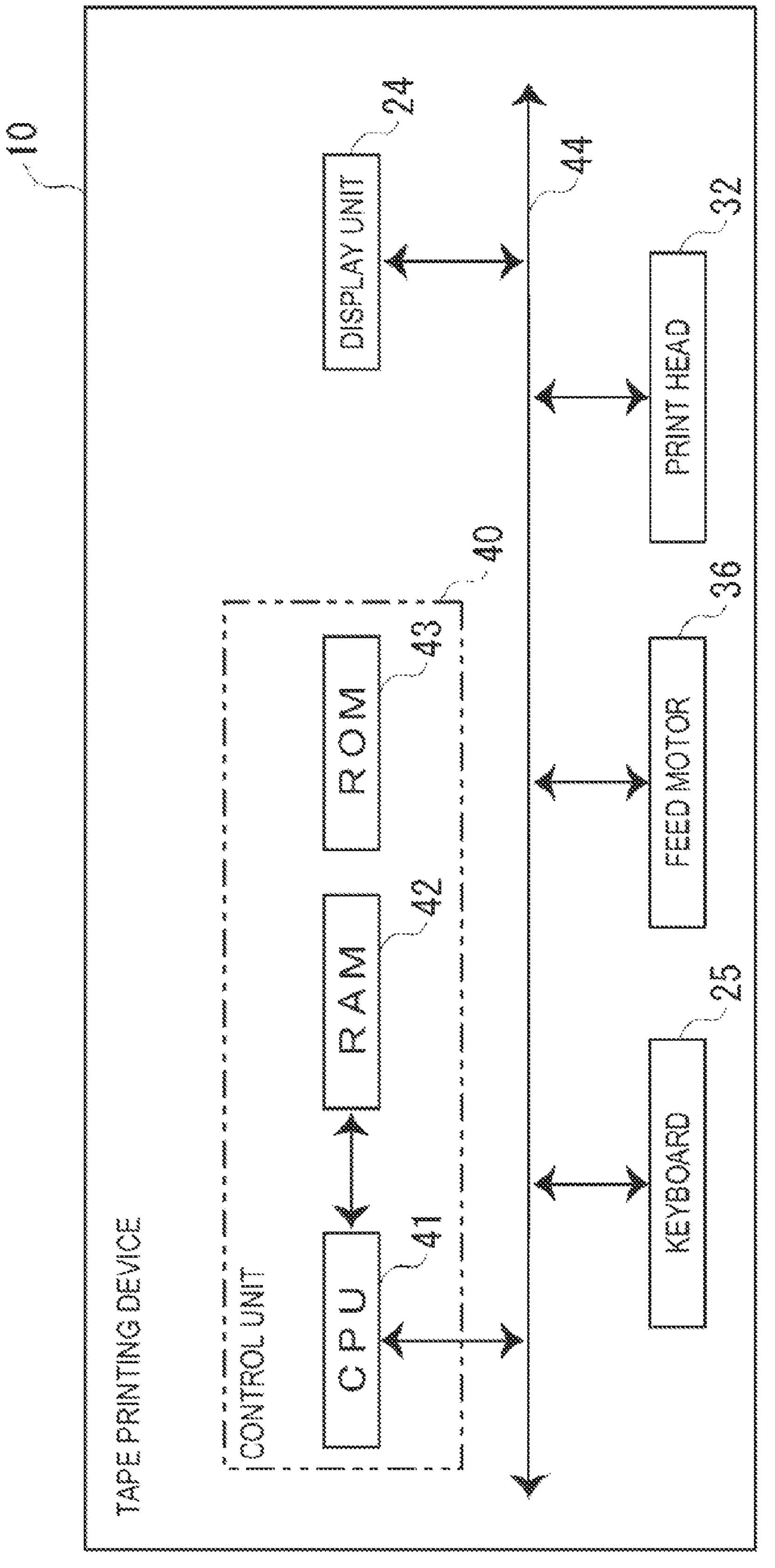
FIG. 3 is a block diagram showing the configuration for control of the tape printing device.

Referring to FIG. 3, the configuration for control of the tape printing device 10 will be described. The tape printing device 10 has the control unit 40, the display unit 24, the keyboard 25, the feed motor 36, and the print head 32. The respective components are connected to each other via a bus 44.

The control unit 40 has a CPU 41 (central processing unit), a RAM 42 (random access memory), and a ROM 43 (read only memory). The CPU 41 performs various kinds of arithmetic processing. The RAM 42 is used as a word area for the CPU 41 to perform various kinds of arithmetic processing. The ROM 43 stores a control program and control data used for the CPU 41 to perform arithmetic processing.

Specifically, the ROM 43 stores a program (tape length calculation program) for calculating a necessary length of the ribbon tape 2 for ribbon wrapping and ribbon tying on the object to be wrapped 1 (necessary tape length). The ROM 43 also stores tying length data, necessary side data and coefficient data, later described.

FIG. 4 shows an example of tying length data. The tying length data is data associating tying method information about a type of ribbon tying with a necessary length of the ribbon tape 2 for ribbon tying (ribbon tying length).

It should be understood that the numeric values in the tying length data is simply an example and not limiting. The tying length data may be configured in such a way that the user can arbitrarily change each numeric value. The same applies to numeric values in the following respective data.

FIG. 5 shows an example of necessary side data. The necessary side data is data associating wrapping method information about a type of ribbon wrapping with a side that is necessary to calculate a ribbon wrapping length (necessary side), of three sides of width, depth and height of the object to be wrapped 1.

FIG. 6 shows an example of coefficient data. The coefficient data is data associating the wrapping method information with a coefficient of a necessary length of the ribbon tape 2 for ribbon wrapping (ribbon wrapping length) to the dimensions of the object to be wrapped 1.

Hereinafter, a series of processing to calculate a necessary tape length according to a tape length calculation program will be described with reference to FIGS. 7A to 10E. It should be noted that the following description assumes that the size of the object to be wrapped 1 is "10 cm in width×12 cm in depth×9 cm in height".

First, a case where the user plans to carry out the wrapping shown in FIG. 1B, that is, wrapping in which the type of ribbon wrapping is "cross wrapping" and the type of ribbon tying is "single bow", is described.

Figures 7A, 7B, 7C, 7D:
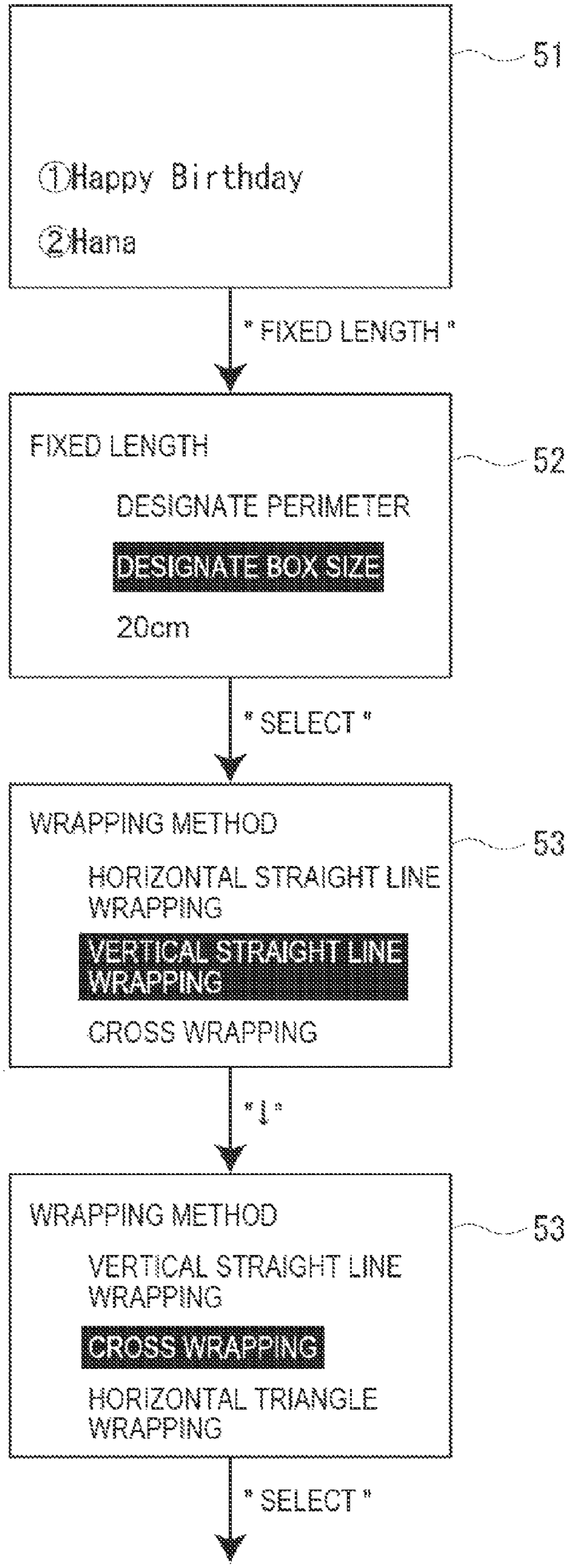
FIGS. 7A to 7D show window transition in a series of processing to calculate a necessary tape length in a tape length calculation program with respect to the ribbon tape shown in FIG. 1B.

The user inputs and edits characters and symbols or the like to be printed on the ribbon tape 2, in a text edit window 51 displayed on the display unit 24 (see FIG. 7A). As the user operates the fixed-length key 30, the control unit 40 causes the display unit 24 to display a fixed-length designation window 52 for designating a length of the ribbon tape 2 on which a print is to be made (which is sent out) (see FIG. 7B).

As the user chooses "designate box size" in the fixed-length designation window 52, the control unit 40 causes the display unit 24 to display a wrapping method selection window 53 for selecting a type of ribbon wrapping (see FIG. 7C). Here, since the type of ribbon wrapping is "cross wrapping", the user chooses "cross wrapping" in the wrapping method selection window 53 (see FIG. 7D). Thus, the tape printing device 10 acquires wrapping method information (wrapping method information acquisition unit).

Figure 8A:
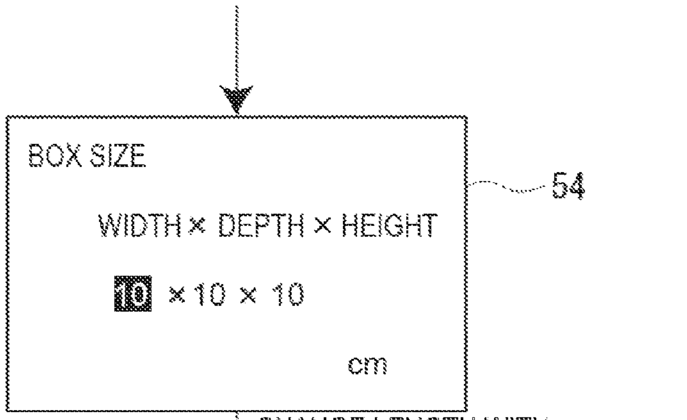
FIGS. 8A to 8D show window transition continued from FIG. 7D.

When the type of ribbon wrapping is chosen, the control unit 40 causes the display unit 24 to display a dimension input window 54 for inputting a dimension of the object to be wrapped 1 (box size) (see FIG. 8A). In this case, the control unit 40 causes the dimension input window 54 to be displayed so that the dimensions of the sides "width×depth×height" associated with the inputted wrapping method information "cross wrapping" will be inputted, referring to the necessary side data stored in the ROM 43 (necessary side storage unit).

Figure 8B:
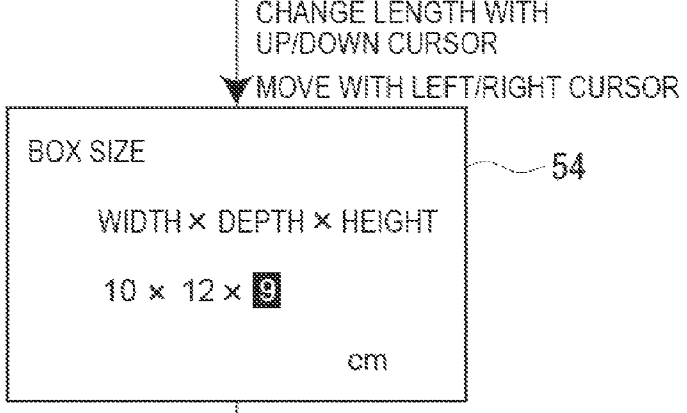
Figure 8C:
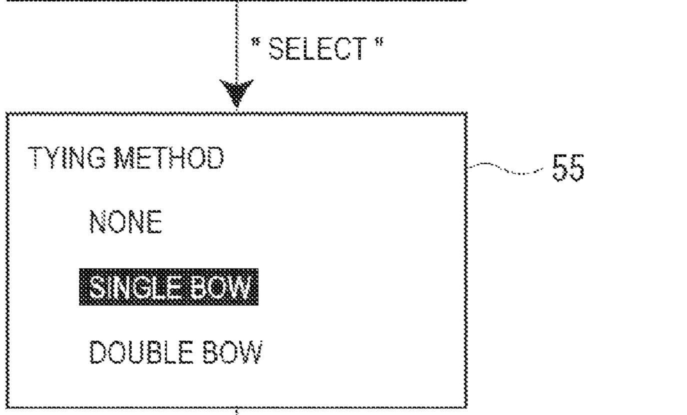
Figure 8D:
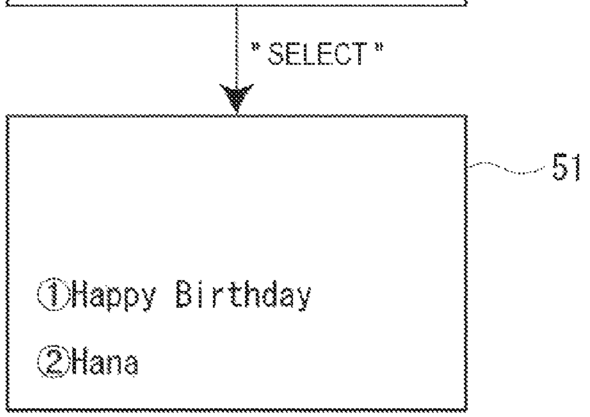

Here, since the size of the object to be wrapped 1 is "10 cm in width×12 cm in depth×9 cm in height", the user inputs width "10"×depth "12"×height "9" cm in the dimension input window 54 (see FIG. 8B). Thus, the tape printing device 10 acquires the dimensions of the object to be wrapped 1 (dimension acquisition unit). As the dimensions of the object to be wrapped 1 are inputted, the control unit 40 causes the display unit 24 to display a tying method designation window 55 for designating a type of ribbon tying (see FIG. 8C). Here, since the type of ribbon tying is "single bow", the user chooses "single bow" in the tying method designation window 55. Thus, the tape printing device 10 acquires the tying method information (tying method information acquisition unit).

As the type of ribbon tying is chosen, the control unit 40 causes the display unit 24 to display the text edit window 51 again (see FIG. 8D) and calculates a necessary tape length based on the input content up to this point. That is, referring to the coefficient data stored in the ROM 43 (coefficient storage unit), the control unit 40 reads out a width "2", a depth "2" and a height "4" as coefficients of a ribbon wrapping length associated with the inputted wrapping method information "cross wrapping". Then, the control unit (wrapping length acquisition unit) calculates a ribbon wrapping length, based on these coefficients, that is, the width "2", the depth "2" and the height "4", and the inputted dimensions of the object to be wrapped 1, that is, "the width "10" cm, the depth "12" cm and the height "9" cm, and using the following equation.

$$\text{Ribbon wrapping length} = \text{width} \times \text{coefficient} + \text{depth} \times \text{coefficient} + \text{height} \times \text{coefficient} = 10 \times 2 + 12 \times 2 + 9 \times 4 = 80\ (\text{cm})$$

Moreover, referring to the tying length data stored in the ROM 43 (tying length storage unit), the control unit 40 (necessary tape length calculation unit) reads out a ribbon tying length "41" cm associated with the inputted trying method information "single bow" and calculates a necessary tape length using the following equation.

$$\text{Necessary tape length} = \text{ribbon wrapping length} + \text{ribbon tying length} = 80 + 41 = 121\ (\text{cm})$$

Then, as the user operates the print key 31, the control unit 40 controls the feed motor 36 to feed the ribbon tape 2 by the calculated necessary tape length, and heats and drives the print head 32 to print the characters, symbols and the like inputted and edited in the text edit window 51 onto the ribbon tape 2. Then, the tape printing device 10 discharges the ribbon tape 2 on which a desired print is made, by the necessary tape length, through the tape discharge port 37. The user cuts out the discharged part with scissors or the like to obtain the ribbon tape 2 having the necessary tape length.

Next, a case where the user plans to carry out the wrapping shown in FIG. 1C, that is, wrapping in which the type of ribbon wrapping is "horizontal triangle wrapping" and the type of ribbon tying is "double bow", is described.

Figure 9A:
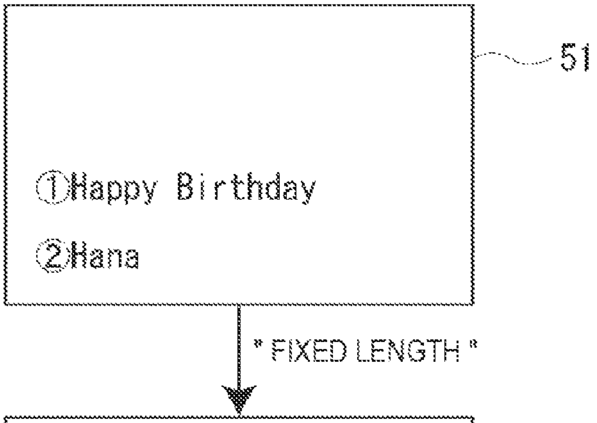
FIGS. 9A to 9D show window transition in a series of processing to calculate a necessary tape length in the tape length calculation program with respect to the ribbon tape shown in FIG. 1C.
Figure 9B:
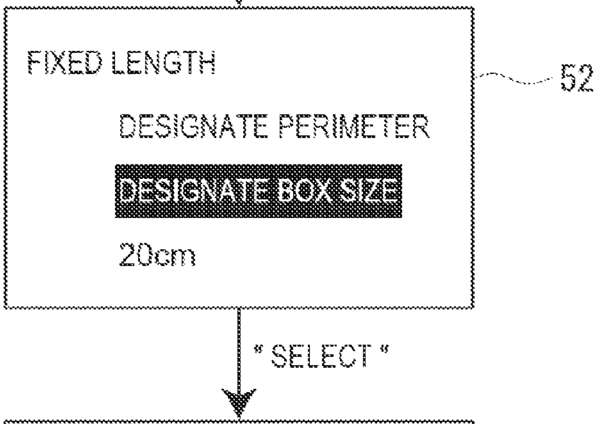
Figure 9C:
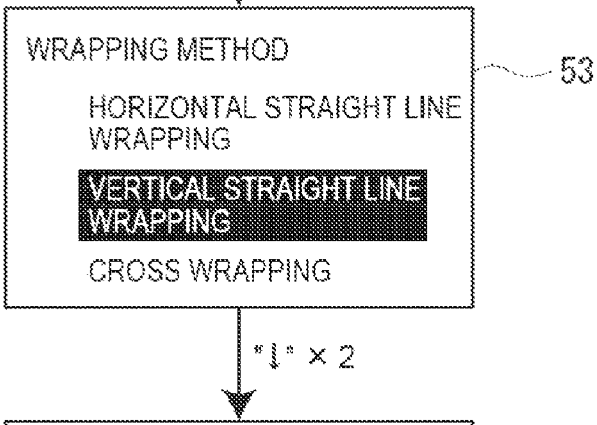
Figure 9D:
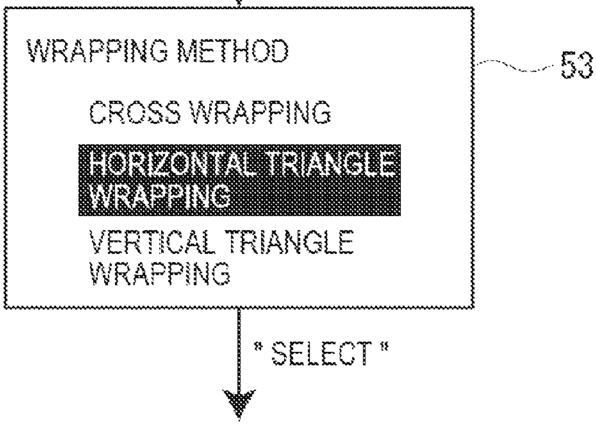

Similarly to the above, when a wrapping method selection window 53 is displayed (see FIG. 9C), in this case, "horizontal triangle wrapping" is chosen in the wrapping method selection window 53 because the type of ribbon wrapping is "horizontal triangle wrapping" (see FIG. 9D). As the type of ribbon wrapping is chosen, the control unit 40 causes the display unit 24 to display a dimension input window 54 for inputting dimensions of the object to be wrapped 1 (see FIG. 10A). In this case, the control unit 40 causes the dimension input window 54 to be displayed so that dimensions of "width×height" associated with the inputted wrapping method information "horizontal triangle wrapping" will be inputted, referring the necessary side data stored in the ROM 43.

Figures 10A, 10B, 10C, 10D, 10E:
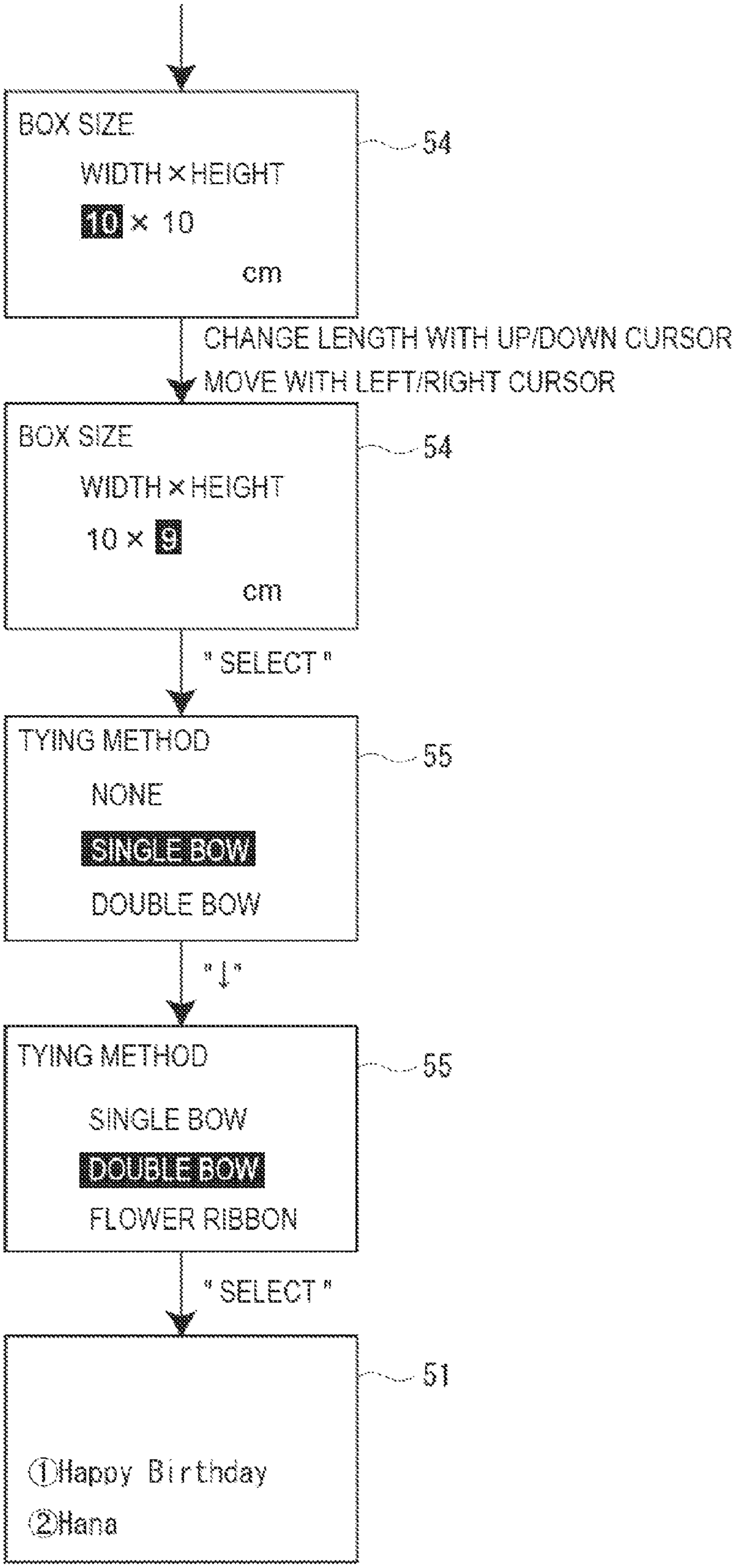
FIGS. 10A to 10E show window transition continued from FIG. 9D.

Here, since the size of the object to be wrapped 1 is "10 cm in width×12 cm in depth×9 cm in height", the user inputs width "10"×height "9" cm in the dimension input window 54 (see FIG. 10B). As the dimensions of the object to be wrapped 1 are inputted, the control unit 40 causes the display unit 24 to display a tying method designation window 55 for designating a type of ribbon tying (see FIG. 10C). Here, since the type of ribbon tying is "double bow", the user chooses "double bow" in the tying method designation window 55 (see FIG. 10D).

As the type of ribbon tying is chosen, the control unit 40 causes the display unit 24 to display the text edit window 51 again (see FIG. 10E) and calculates a necessary tape length based on the input content up to this point. That is, referring to the coefficient data, the control unit 40 reads out a width "5" and a height "4" as coefficients of a ribbon wrapping length associated with the inputted wrapping method information "horizontal triangle wrapping". Then, the control unit 40 calculates a ribbon wrapping length, based on these coefficients, that is, the width "5" and the height "4", and the inputted dimensions of the object to be wrapped 1, that is, "the width "10" cm and the height "9" cm, and using the following equation.

Ribbon wrapping length=width×coefficient+height×coefficient=10×5+9×4=86 (cm)

Moreover, referring to the tying length data, the control unit 40 reads out a ribbon tying length “81” cm associated with the inputted trying method information “double bow” and calculates a necessary tape length using the following equation.

Necessary tape length=ribbon wrapping length+ribbon tying length=86+81=167 (cm)

Then, as the user operates the print key 31, the tape printing device 10 carries out print processing similar to the foregoing example and discharges the ribbon tape 2 on which a print is made, by the necessary tape length, through the tape discharge port 37.

Although not described in detail, a necessary tape length can be calculated similarly to the foregoing example also in a case where the user plans to carry out wrapping in which the type of ribbon wrapping is “horizontal straight line wrapping” and the type of ribbon tying is “none” as shown in FIG. 1A. That is, in this case, a necessary tape length is calculated using the following equations.

Ribbon wrapping length=width×coefficient+height×coefficient=10×2+9×2=38 (cm)

Necessary tape length=ribbon wrapping length+ribbon tying length=38+1=39 (cm)

As described above, according to the tape printing device 10 of this embodiment, the control unit 40 calculates a ribbon wrapping length based on inputted dimensions of the object to be wrapped 1 and calculates a necessary tape length based on the calculated ribbon wrapping length and a ribbon tying length stored in the ROM 43, by means of the tape length calculation program. Therefore, even when it is difficult for the user to estimate a ribbon tying length, a necessary tape length can be easily found as the user inputs dimensions of the object to be wrapped 1. Thus, a ribbon tape 2 with a print thereon having an appropriate length for ribbon wrapping and ribbon tying can be provided easily.

Also, the control unit 40 calculates a ribbon wrapping length, based on a coefficient of a ribbon wrapping length associated with wrapping method information and dimensions of the object to be wrapped 1. Therefore, as the user inputs wrapping method information and dimensions of the object to be wrapped 1, a ribbon wrapping length corresponding to the wrapping method information (type of ribbon wrapping) can be easily found. Thus, even when the user carries out plural types of ribbon wrapping, an appropriate necessary tape length for each type can be found and convenience can be enhanced. This is particularly convenient in the case of complicated ribbon wrapping such as triangle wrapping.

Moreover, the control unit 40 causes the display unit 24 to display the dimension input window 54 so as to cause the user to input only a necessary side to calculate a ribbon wrapping length, according to the type of ribbon wrapping. Therefore, the user can be made to input only the dimension of a necessary side to calculate a ribbon wrapping length, of the three sides of width, depth and height of the object to be wrapped 1. The user’s time and effort for input can be saved.

Also, the control unit 40 calculates a necessary tape length based on a ribbon tying length associated with tying method information. Therefore, as the user inputs tying method information, a necessary tape length corresponding to the tying method information (type of ribbon tying) can be easily found. Thus, even when the user carries out plural types of ribbon tying, an appropriate necessary tape length for each type can be found and convenience can be enhanced. This is particularly convenient in the case of complicated ribbon tying such as double bow.

Up to now, the case where the object to be wrapped 1 is a rectangular parallelepiped is described. However, the invention is not limited to this example. The invention can also be applied, for example, to a case where the object to be wrapped 1 is a teddy bear, on which ribbon wrapping and ribbon tying is carried out around the neck thereof with the ribbon tape 2.

Figures 11A, 11B, 11C, 11D:
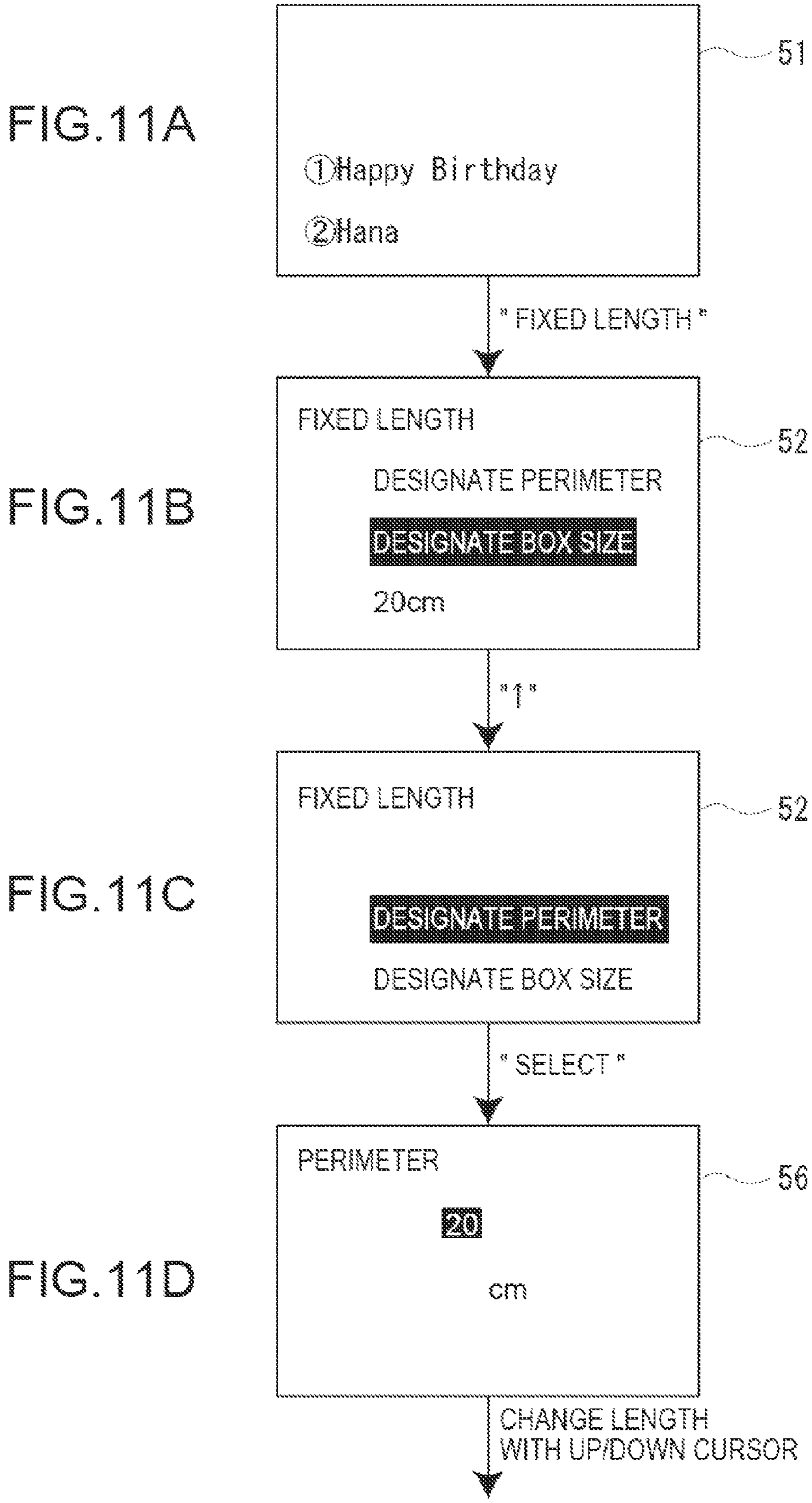
FIGS. 11A to 11D show window transition in a series of processing to calculate a necessary tape length in the tape length calculation program with respect to a ribbon tape used for ribbon wrapping and ribbon tying on an object to be wrapped that is not a rectangular.

In this case, as shown in FIG. 11A to FIG. 12C, as the user chooses “designate perimeter” in a fixed-length designation window 52 (see FIG. 11C), the control unit 40 causes the display unit 24 to display a perimeter input window 56 for inputting a perimeter of a site where ribbon wrapping is performed, on the object to be wrapped 1 (see FIG. 11D).

Figure 12A:
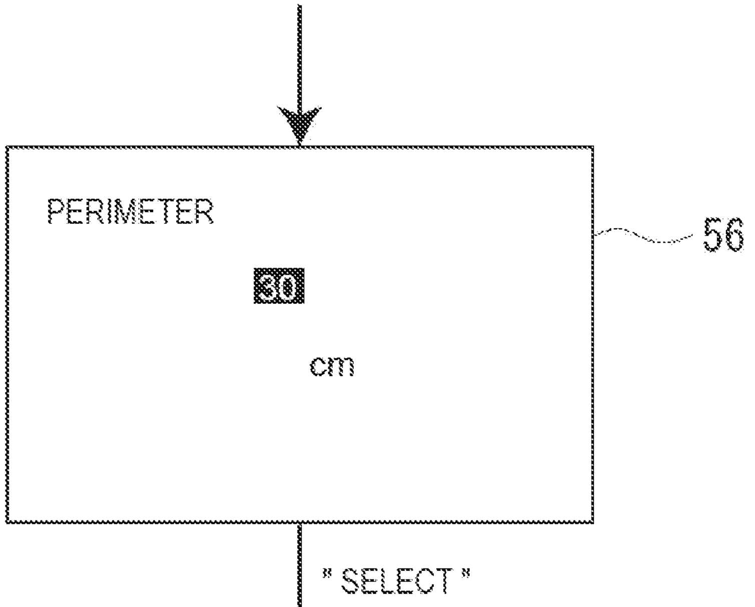
FIGS. 12A to 12C show window transition continued from FIG. 11D.
Figure 12B:
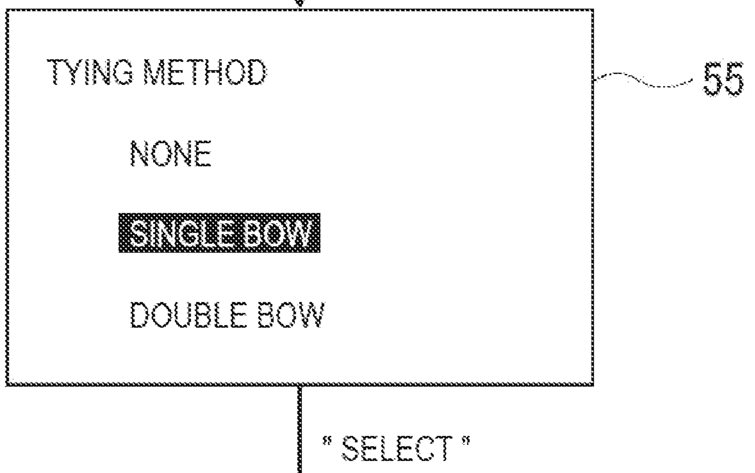
Figure 12C:
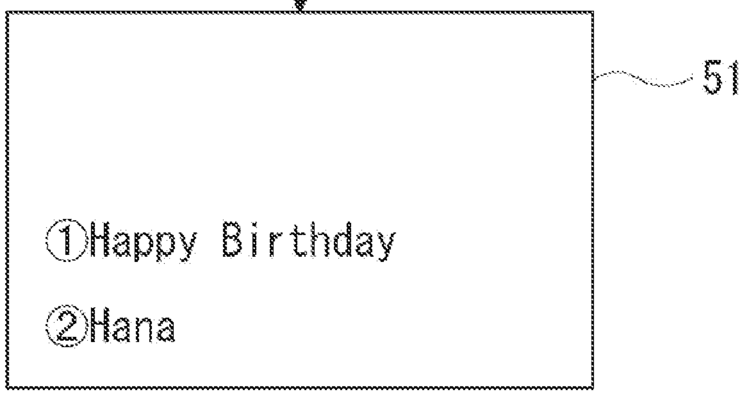

Here, if the size around the neck of the teddy bear is 30 cm, the user inputs “30” cm in the perimeter input window 56 (see FIG. 12A). As the perimeter of the object to be wrapped 1 is inputted, the control unit 40 causes the display unit 24 to display a tying method designation window 55 for designating a type of ribbon tying (see FIG. 12B). Here, if the planned type of ribbon tying is “single bow”, the user chooses “single bow” in the tying method designation window 55.

When the type of ribbon tying is chosen, the control unit 40 causes the display unit 24 to display the text edit window 51 again (see FIG. 12C) and calculates a necessary tape length based on the input content up to this point. That is, the control unit 40 acquires the inputted perimeter “30” cm as a ribbon wrapping length, reads out a ribbon tying length “41” cm associated with the inputted tying method information “single bow”, and calculates a necessary tape length using the following equation.

Necessary tape length=ribbon wrapping length+ribbon tying length=30+41=71 (cm)

In this manner, even in the case where the object to be wrapped 1 is not a rectangular parallelepiped, a necessary tape length can be easily found as the user inputs the perimeter of the object to be wrapped 1.

Also, while dimensions and the like of the object to be wrapped 1 are inputted in the tape printing device 10 in this embodiment, this example is not limiting. For example, a text to be printed, a type of ribbon wrapping, a box size and a size of ribbon tying may be inputted to an information processing device (for example, a smartphone) in which print application software is installed, so as to generate print data, and the print data may be sent to the tape printing device 10.

Also, while a tape length is calculated based on the type of ribbon tying chosen by the user in this embodiment, this example is not limiting. For example, it is possible to select or input size of ribbon tying. Moreover, a size of ribbon tying may be automatically set, based on the dimension of at least one side, of the three sides of width, depth and height of the object to be wrapped. Thus, proper balance can be set between the size of the object to be wrapped and the size of ribbon tying, thus enabling good appearance of the wrapping.

Also, while the necessary tape length calculation unit in this embodiment calculates a necessary length of the ribbon tape 2 for ribbon wrapping and ribbon tying on the object to be wrapped 1 as a necessary tape length, this example is not limiting. The necessary tape length calculation unit may calculate a necessary length of the ribbon tape 2 for ribbon wrapping or ribbon tying, as a necessary tape length. It suffices that the tape printing device has at least necessary side data and coefficient data when performing ribbon wrapping, and at least tying length data when performing ribbon tying.

What is claimed is:

1. A tape printing device for printing on a ribbon tape, comprising:

a wrapping length acquisition unit that acquires a ribbon wrapping length, which is a necessary length of a ribbon tape for ribbon wrapping, of a necessary tape length, which is a necessary length of the ribbon tape for ribbon wrapping and ribbon tying on an object to be wrapped;

a tying length storage unit in which a ribbon tying length, which is a necessary length of the ribbon tape for ribbon tying, of the necessary tape length, is stored; and a necessary tape length calculation unit that calculates the necessary tape length based on the ribbon wrapping length that is acquired and the ribbon tying length that is stored.

2. The tape printing device according to claim 1, further comprising a dimension acquisition unit which acquires dimensions of at least two sides corresponding to sites where the ribbon tape is laid for ribbon wrapping, of three sides of width, depth and height of the object to be wrapped that is in the shape of a rectangular, wherein the wrapping length acquisition unit calculates the ribbon wrapping length based on the dimensions that are acquired.

3. The tape printing device according to claim 2, further comprising:

a wrapping method information acquisition unit which acquires wrapping method information about a type of ribbon wrapping on the object to be wrapped; and a coefficient storage unit in which coefficient data associating the wrapping method information with a coefficient of the ribbon wrapping length corresponding to the dimensions is stored, wherein the wrapping length acquisition unit calculates the ribbon wrapping length, based on the coefficient of the ribbon wrapping length associated with the wrapping method information that is acquired and the dimensions that are acquired.

4. The tape printing device according to claim 3, further comprising a necessary side storage unit in which necessary side data associating the wrapping method information with a necessary side to calculate the ribbon wrapping length, of the three sides of width, depth and height of the object to be wrapped, is stored, wherein the dimension acquisition unit has a display unit for displaying a dimension input window to cause the user to input the dimensions, and causes the display unit to display the dimension input window where the side inputted by the user is changed, based on the necessary side associated with the wrapping method information that is acquired.

5. The tape printing device according to claim 1, further comprising a tying method information acquisition unit which acquires tying method information about a type of ribbon tying on the object to be wrapped, wherein the tying length storage unit stores tying length data associating the ribbon tying length with the tying method information, and the necessary tape length calculation unit calculates the necessary tape length, based on the ribbon tying length associated with the tying method information that is acquired.

6. A tape length calculation method comprising:

acquiring, by a tape printing device for printing a length of ribbon tape, a ribbon wrapping length, which is a necessary length of a ribbon tape for ribbon wrapping, of a necessary tape length, which is a necessary length of the ribbon tape for ribbon wrapping and ribbon tying on an object to be wrapped;

reading out, by the tape printing device, a ribbon tying length, which is a necessary length of the ribbon tape for ribbon tying, from a storage unit in which ribbon tying length data is stored; and calculating, by the tape printing device, the necessary tape length based on the ribbon wrapping length that is acquired and the ribbon tying length that is read out.

7. A non-transitory computer-readable recording medium in which a program for causing a computer to execute the tape length calculation method according to claim 6 is recorded.

* * * * *